Dec. 11, 1928.
O. H. PIEPER
1,694,669
CORD HOLDING STRUCTURE
Filed April 2, 1926   2 Sheets-Sheet 2
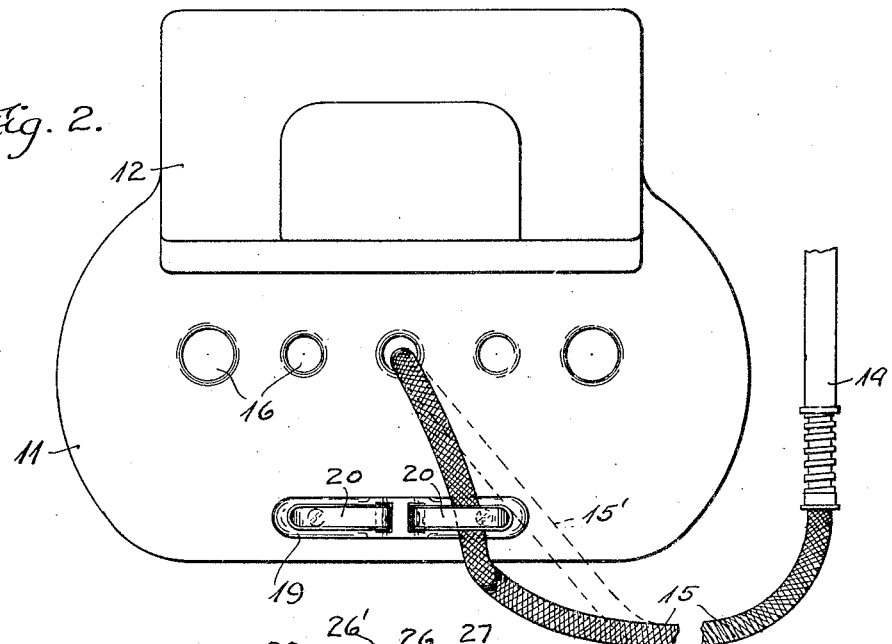
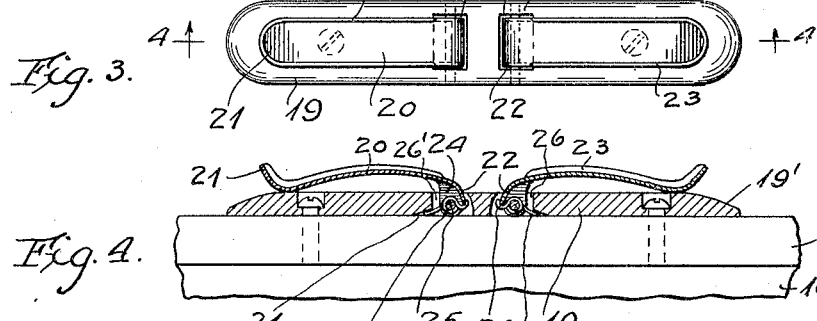
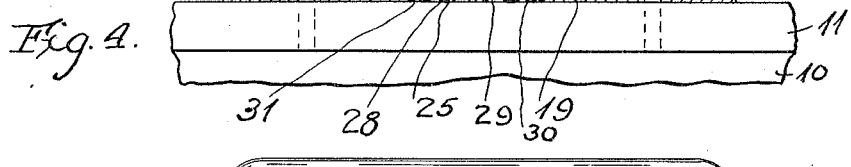
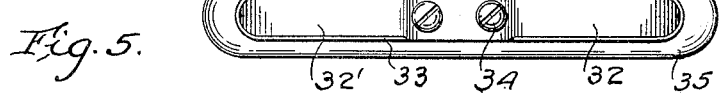
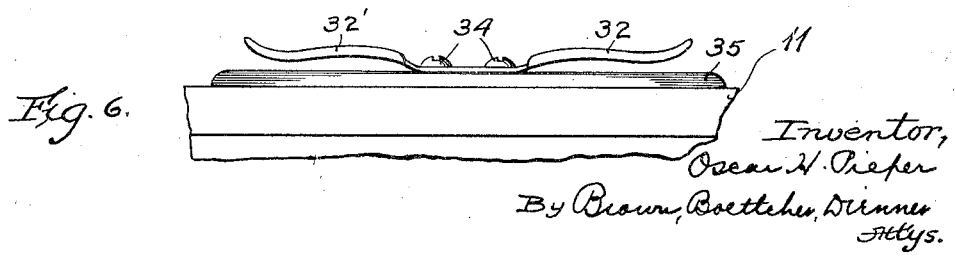

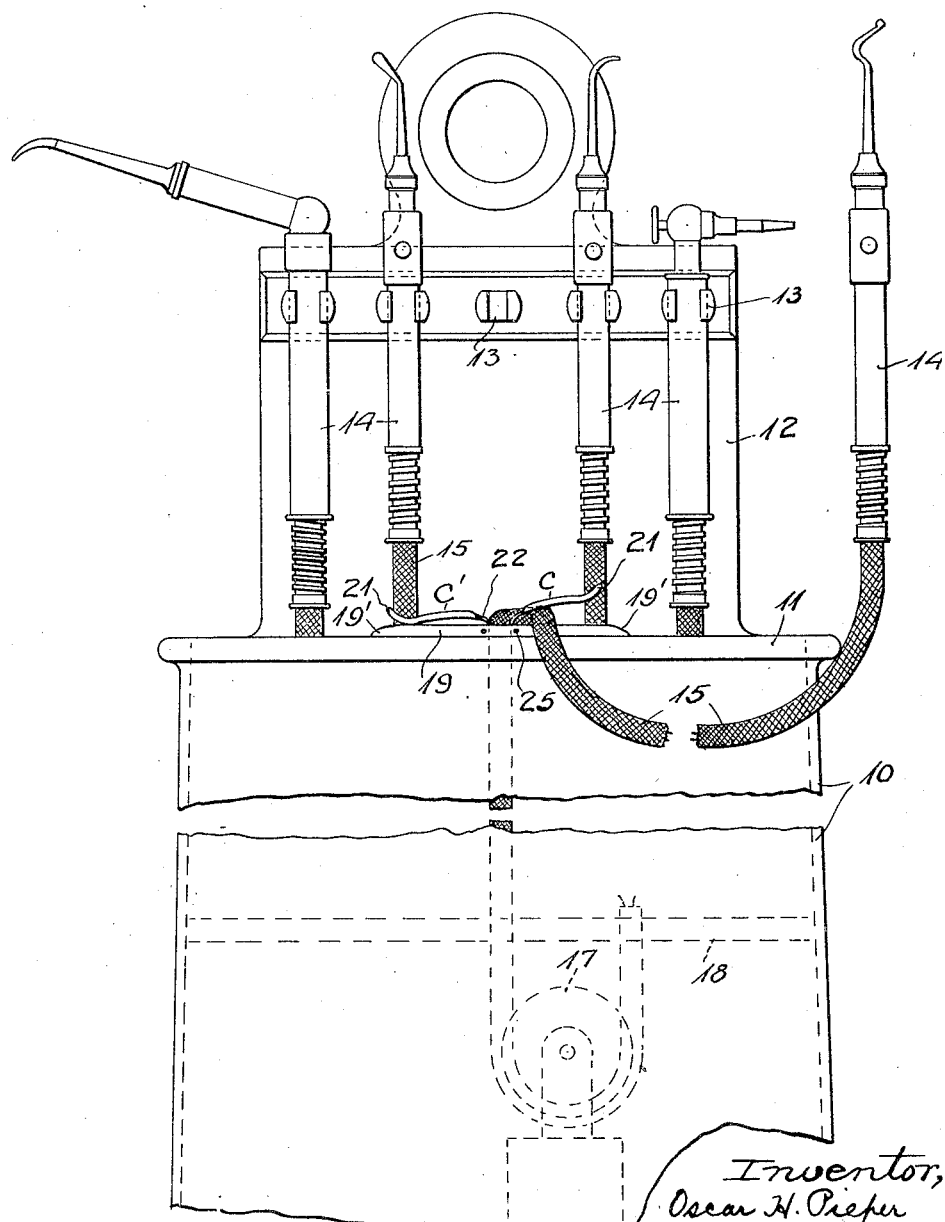

Patented Dec. 11, 1928.

1,694,669

UNITED STATES PATENT OFFICE.

OSCAR H. PIEPER, OF ROCHESTER, NEW YORK.

CORD-HOLDING STRUCTURE.

Application filed April 2, 1926. Serial No. 99,297.

This invention relates to an improved cord holding structure particularly useful in connection with dental units for receiving the cord of an extended instrument for relieving the extended end of the cord from the pull of the weight positioned within the unit body and tending to pull in the cord and hold it inside of the body when the instrument is in its position of rest on the unit. The structure is in the form of a resilient or spring actuated clip readily applicable on the top of the unit in front of the instrument support so that when an instrument is removed from its support and its cord extended, a slight downward and lateral pull of the cord will readily slip the cord under the clip so that the clip will take up the pull of the cord weight and will leave the part of the cord beyond the clip free so that the instrument may be readily manipulated and used. Any number of clips may be used but it has been found that a clip structure comprising a right clip and a left clip will serve efficiently for receiving any of the cords of the unit.

The invention will be clearly understood by reference to the drawings, in which, Figure 1 is a front elevational view of the upper part of a unit showing a number of instruments supported thereon and my improved cord holding structure;

Fig. 2 is a plan view of the unit;

Fig. 3 is an enlarged plan view of the clip structure;

Fig. 4 is a sectional view on plane 4—4, Figure 3;

Fig. 5 is a plan view of a modified form of clip structure; and

Fig. 6 is a side elevational view of such modified structure.

I have shown the upper part of the unit body or pedestal 10 which has the top or table part 11 from the rear of which rises the offset extension 12. Secured to the front of extension 12 over the table part 11 is the row of brackets 13 for supporting the various instruments 14 from which extend cords 15 through the openings 16 in the table part 11, each cord within the pedestal part 10 being engaged by a weighted pulley 17 and secured at one end to a support 18 so that connection can be made with the ends of electrical conductors or air supply conductors, the arrangement being substantially like that shown in Patent No. 1,376,356, of April 26, 1921, so far as the cords and weights are concerned. These pulley weights tend to hold the cords taut when the instruments are supported on the bracklets, and to restore the cord to such taut position when a tool is replaced on its bracket after an extension of its cord during service of the tool.

When an instrument is removed from its supporting bracket to be utilized, it is very important that the weight of the pulley be released from the cord so that the instrument will be free from any pull or drag by the cord. My improved clip structure is designed for this purpose. As shown in Figures 1 to 4, the cord holding structure comprises a right clip C and a left clip C', these clips being supported on a base or plate 19 mounted centrally on the table part 11 in front of the cord passageways with the clips extending respectively to the right and left. The clips are stamped integral from sheet metal and each comprises the slightly upwardly convex body part 20 whose outer end 21 is gradually deflected upwardly and whose rear end 22 is deflected downwardly. Along the sides of the body part and end 21 the flanges 23 give rigidity and strength to the clips, and at the sides of the normally deflected inner end 22 are the ears 24 for receiving the pivot pin 25, the plate 19 having the pockets 26 and 26' into which the inner ends of the respective clips extend, the pins extending through and being supported in the side walls 27 adjacent to the pockets. Within each pocket a helical spring 28 encircles the pin, the outer end 29 of the spring hooking under the inner edge of the clip and the outer end 30 of the spring extending into a notch 31 cut in the plate 19. The springs tend to hold the clips with their outer ends against the plate 19, the outer edges of the plate, as indicated at 19' being beveled below the upwardly inclined end of the clip to form a flaring entrance for a cord to its position between the clip and the plate.

On Figures 1 and 2 I have shown the central instrument 14 removed from the unit for use. The operator first withdraws the instrument from its supporting clip and then pulls the cord out horizontally along the table part 11 and alongside of the flared entrance of one of the clips as illustrated by the dotted line 15' in Figure 2. Then a lateral swing will force the cord against the deflected end 21 of the clip and the clip will be raised and the cord will be brought between the clip body and the plate 19 as shown by the full line.

The spring 25 will cause the clip to exert sufficient pressure against the cord to hold it against the weight of its pulley 17 so that the cord beyond the clip will be entirely free from any restraint or drag and the instrument can be readily and efficiently manipulated by the operator. When the operator is finished a lateral swing of the cord will withdraw it from the clip and then the pulley weight will become effective to restore the cord as the instrument is replaced on its supporting bracket. Either clip can be used by the operator. A separate clip could of course be provided for each cord but I have found that two clips arranged as shown will be ample for the efficient clamping of any of the cords.

In Figures 5 and 6 a modified form of clip structure is shown. Here the clip ends 32 and 32′ are parts of an integral sheet metal stamping, the metal having sufficient spring action so that the clip ends will exert the necessary clamping action against a cord slipped thereunder. The clip ends may be strengthened by peripheral flanges 23 and the clip structure may be secured by screws 34 together with a plate 35 to the table part 11 of the unit.

By means of the simple clip arrangement the operator when extending an instrument for use can by a slight and simple movement of the cord readily engage the cord under a clip and will then give free and unhampered use of the instrument. A simple slight movement of the cord will release it from the clip to permit the cord to be restored to normal position as the instrument is being replaced on its support.

I do not desire to be limited to the exact construction or arrangement of cord holding structures as different forms and arrangements are possible without departing from the scope of my invention. I claim the following:—

1. In a dental unit, the combination of a supporting body, instruments supported thereon, cords extending from said instruments to the interior of the body, means exerting tension on said cords tending to prevent withdrawal of said cords from said body, and a clip placed on said body and under which any one of said cords may be slipped when in use to be held against the force of its tension means to thereby relieve its instrument from the tension.

2. In a dental unit, the combination of a supporting body, a plurality of dental instruments supported on said body, power supply cords extending from said instruments to the interior of said body, tension means within said body tending to resist withdrawal of said cords from said body, and cord holding structure on said body comprising a plurality of spring clips under any one of which a withdrawn cord may be slipped when in use to be held against retraction into said body by the tension means to thereby relieve its instrument from the tension.

3. In a dental unit, the combination of a supporting body, a plurality of instruments supported on said body, cords for said instruments extending to the interior of the body, tension means tending to hold said cords within said body and resist withdrawal therefrom, and a cord holding structure mounted on top of said body in front of said cords and comprising spring actuated clips under which any one of said cords may be slipped when withdrawn from the body to be thereby locked in its outer position and the pull of the tension device relieved from the instrument.

4. In a dental unit, the combination of a body having a table part, dental instruments supported on said body over said table part, said table part having openings below said instruments, cords extending from said instruments through said openings and into the interior of said body, tension devices within said body acting on said cords to resist withdrawal thereof from said body when an instrument is to be used, and a spring clip on top of said table part in front of the cord openings into which clip any withdrawn cord may be laterally shifted to be clamped against retraction by its tension device and to withhold the tension from the cord instrument.

5. In a dental unit, the combination of a body having a table part, a row of instruments detachably supported on said body over said table part, said table part having openings below said instruments, cords extending from said instruments through said openings into the body part, tension devices within said body acting on said cords to resist withdrawal thereof out of said openings when an instrument is to be used, and two clips located centrally on top of said table part in front of said cord openings and extending laterally in opposite directions, each serving to receive the withdrawn cords when shifted laterally along said table part to clamp and lock said cords against retraction by the tension devices and to relieve the respective instruments from the cord tension.

In witness whereof, I hereunto subscribe my name this 29th day of March, 1926.

OSCAR H. PIEPER.